United States Patent [19]

Ramler

[11] 4,010,374
[45] Mar. 1, 1977

[54] ULTRAVIOLET LIGHT PROCESSOR AND METHOD OF EXPOSING SURFACES TO ULTRAVIOLET LIGHT

[75] Inventor: Warren J. Ramler, Elmhurst, Ill.
[73] Assignee: PPG Industries, Inc., Pittsburgh, Pa.
[22] Filed: June 2, 1975
[21] Appl. No.: 583,311
[52] U.S. Cl. .......................... 250/492 R; 250/504
[51] Int. Cl.² ...................................... H01J 37/20
[58] Field of Search .......... 250/504, 453, 554, 556, 250/492 R, 491; 350/393; 21/DIG. 2

[56] References Cited
UNITED STATES PATENTS

| | | | |
|---|---|---|---|
| 1,948,239 | 2/1934 | Redd | 250/453 |
| 3,028,483 | 4/1962 | Simmon | 350/293 |
| 3,449,561 | 6/1969 | Basil et al. | 350/293 |
| 3,790,801 | 2/1974 | Coleman | 250/455 |

Primary Examiner—Alfred E. Smith
Assistant Examiner—B. C. Anderson
Attorney, Agent, or Firm—George D. Morris

[57] ABSTRACT

Ultraviolet light processors which expose the central region of the surface of a workpiece to more ultraviolet light than the edges are provided with secondary sources of ultraviolet light which expose the edges to more ultraviolet light than the central region. The central region and the edges are therefore exposed to approximately equal total amounts of ultraviolet energy per unit area.

30 Claims, 4 Drawing Figures

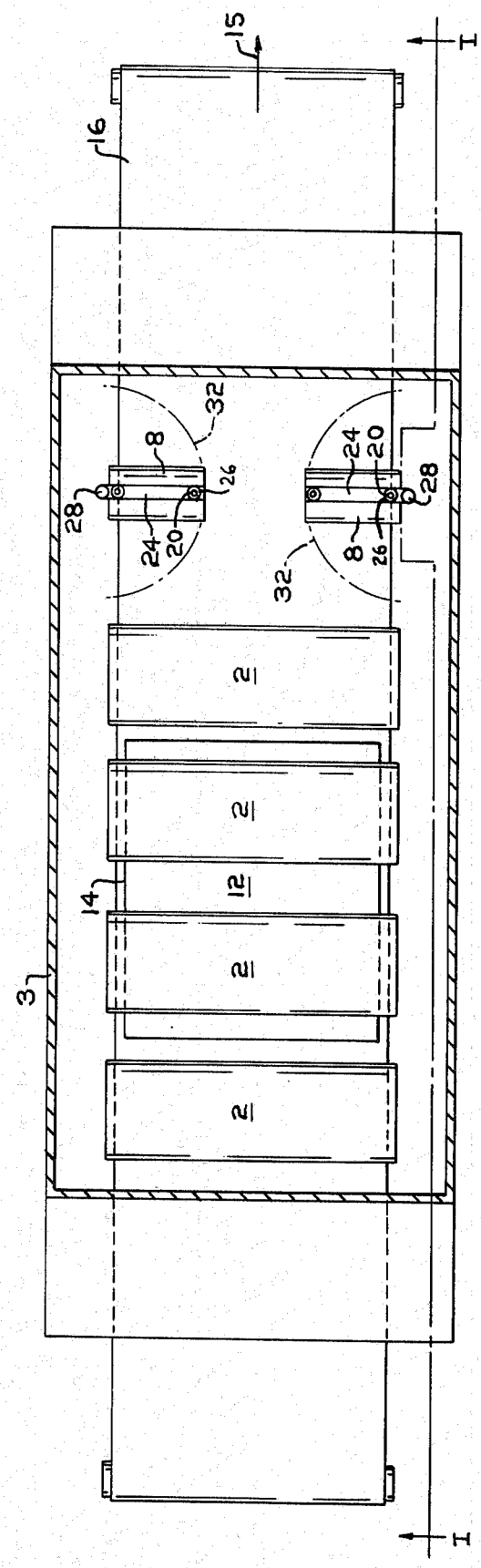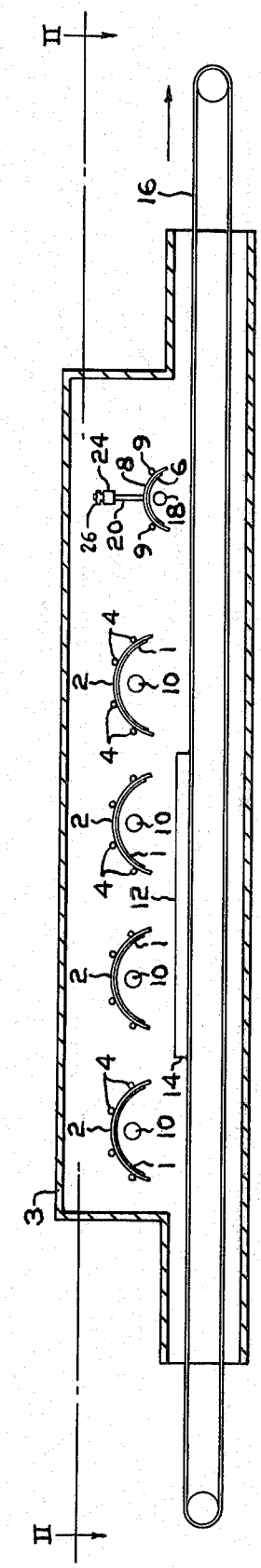

ULTRAVIOLET LIGHT PROCESSOR AND METHOD OF EXPOSING SURFACES TO ULTRAVIOLET LIGHT

Processes in which products are treated with ultraviolet light, such as to effect polymerization, sterilization, etc., are becoming of increasing interest. The use of ultraviolet light coating processors to cure ultraviolet light sensitive coatings is especially becoming more widespread. Advantages of ultraviolet light curing include the ability to use resin systems which have little or no volatile solvents, the speed with which cure may be accomplished and simplicity of operation.

Ultraviolet light processors employ primary means for exposing the surface of a workpiece to ultraviolet light. Such primary means generally comprises at least one primary optical system comprising a first source of ultraviolet light and a reflector for reflecting ultraviolet light from the source to the surface of the workpiece. Usually the primary means comprises a plurality of such primary optical systems. Such primary optical systems are generally arranged such that the ultraviolet flux from the primary means incident per unit area of the surface of the workpiece is greater at the central region of the surface than at an edge thereof. Accordingly, the typical result is that either the edge is substantially underexposed to ultraviolet energy or the central region is substantially overexposed. The present invention is an improvement to ultraviolet light processors and to the method of operating ultraviolet light processors which permits the central region and such an edge of the surface of a workpiece to be exposed to approximately equal total amounts of ultraviolet energy per unit area. This is accomplished by providing the ultraviolet light processor with secondary means for exposing the surface of the workpiece to ultraviolet light such that the ultraviolet flux from the secondary means incident per unit area of the surface is greater at the edge than at the central region thereof. Such secondary means generally comprises at least one secondary optical system comprising a second source of ultraviolet light and a reflector for reflecting ultraviolet light from the source to the surface. The secondary means may comprise a plurality of such secondary optical systems.

Quite often the ultraviolet flux from the primary means incident per unit area of the surface of the workpiece is greater at the central region than at two edges thereof. Usually, but not necessarily, the two edges are lateral edges and are on opposite sides of the workpiece. One embodiment of the invention permits the central region and the two edges to be exposed to approximately equal amounts of ultraviolet energy per unit area. This is accomplished by providing the ultraviolet light processor with secondary means for exposing the surface to ultraviolet light such that the ultraviolet flux from the secondary means per unit area of surface is greater at one of the edges than at the central region thereof, and by providing the ultraviolet light processor with other secondary means for exposing the surface to ultraviolet light such that the ultraviolet flux from the other secondary means incident per unit area of the surface is greater at the other of the edges than at the central region of the surface. Such other secondary means also generally comprises at least one other secondary optical system comprising a source of ultraviolet light and a reflector for reflecting ultraviolet light from the source to the surface. The other secondary means may comprise a plurality of such other secondary optical systems.

For a better understanding of the invention, reference may be made to the drawings wherein like reference numerals refer to like parts in which:

FIG. 1 illustrates an ultraviolet light processor of the present invention and is a sectional view taken along the line I—I of FIG. 2;

FIG. 2 is a sectional view taken along the line II—II of FIG. 1;

Figure 3:
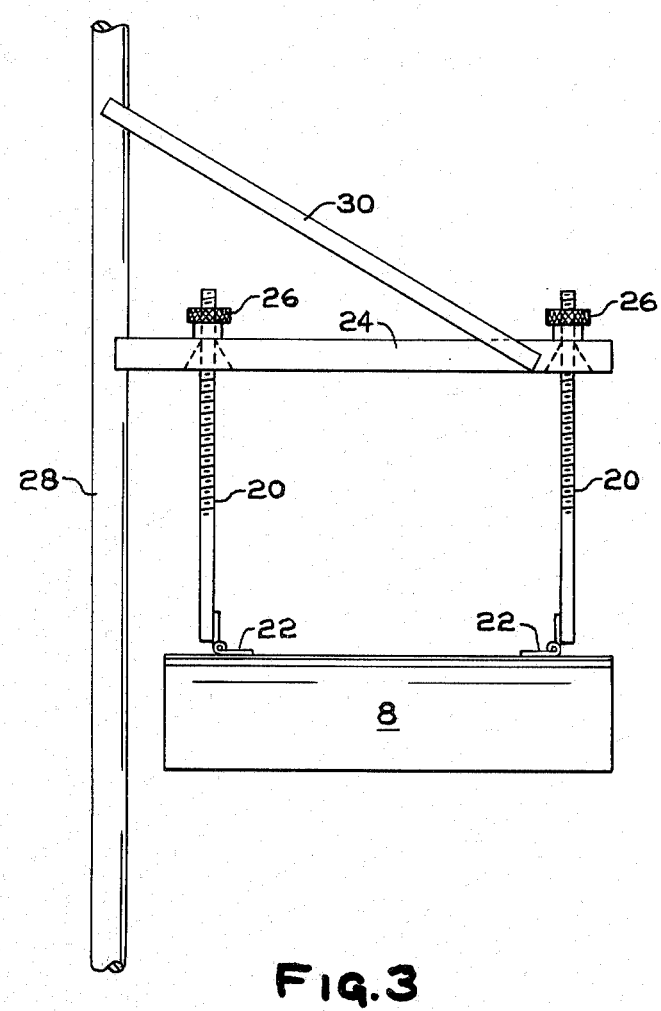
FIG. 3 shows an exemplary manner of mounting a secondary means for exposing the surface of a workpiece to ultraviolet light.

Referring now in more detail to the Figures where the invention will be described with respect to illustrative embodiments thereof, FIGS. 1 and 2 show an ultraviolet light processor having a housing 3 containing primary reflectors 1 held in place by primary base members 2 which may also have affixed thereto conduits 4 (not shown in FIG. 2) for circulating coolant therethrough. Secondary reflectors 6 are held in place by secondary base members 8 to which may be affixed conduits 9 (not shown in FIG. 2) for circulating coolant therethrough.

The reflectors may be bright aluminum sheet (e.g., "Alzak," Aluminum Company of America; "Lurium," of European origin) or other ultraviolet light reflective material and may be held in place by screws or slots, not shown. The reflectors are generally concave and often they are substantially elliptical cylindrical reflectors. Each such reflector has a first focus and a second focus more remotely located from the reflectors than the first focus. Most often, substantially linear sources of ultraviolet light are located at the first foci of the reflectors, although moderate displacements from the first foci are sometimes used. The eccentricity of the substantially elliptical cylindrical reflectors is in the range of from about 0.2 to about 0.9 and is calculated from the formula $$e = (Z-z)/Z+z)$$

where $e$ is the eccentricity, $Z$ is the distance of the second focus from the vertex of the ellipse and $z$ is the distance of the first focus from the vertex of the ellipse. Usually the eccentricity is in the range of from about 0.5 to about 0.8. While precisely elliptical reflectors are often employed in the invention, shapes which substantially approximate an ellipse and which introduce inconsequential aberrations may be used. In most systems, a circle closely approximates an ellipse and may be used in lieu of a precise ellipse without introducing appreciable undesirable aberrations. Lines tangent to the circular arc are sometimes used to approximate portions of the ellipse having slight curvature. Since most of the base members are formed by extruding aluminum through a die, use of lines and circular arcs permits easier fabrication of the die than if precisely elliptical arcs were employed. In one embodiment, the concave curve of base member 2 is a circular arc of 6.667 centimeters radius which subtends an angle of 134° at the center of the circle. The circular arc is symmetrical about the major axis of the ellipse being approximated. The two extremities of the base member are straight lines tangent to the ends of the circular arc. Alzak aluminum sheet having a thickness of about 0.076 centimeter is attached to the inner surface of the base member using screws. The first focus of the substantially elliptical cylindrical reflector lies in the plane of symmetry and is 3.835 centimeters from the vertex of the reflector. The second focus also lies in the plane of symmetry and is 13.836 centimeters from the vertex of the reflector. The eccentricity of the reflector is therefore 0.566.

The reflectors 1 and generally linear first sources of ultraviolet light 10 are located such that the reflectors 1 reflect ultraviolet light from their respective sources 10 to the surface 12 of a workpiece 14. Usually surface 12 is moved continuously along a path of travel 15 through the ultraviolet light exposure regions of the ultraviolet light processor by suitable means such as conveyor 16. When the workpiece is of continuous or of very great length, such as is customary in printing processes, the workpiece is generally moved along the path of travel through the ultraviolet light processor by power driven rolls as is conventional in many types of printing presses.

The reflectors 6 and generally linear second sources of ultraviolet light 18 are similarly located such that the reflectors 6 reflect ultraviolet light from their respective sources 18 to the surface 12 of workpiece 14.

Figure 4:
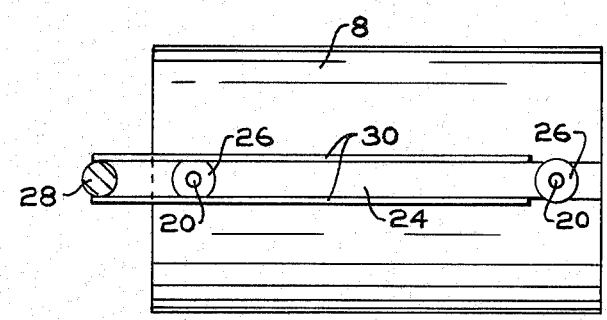
FIG. 4 is a plan view of the apparatus of FIG. 3.

It is preferred that the ultraviolet light processor include means for varying the distance between the secondary means for exposing the surface of the workpiece to ultraviolet light and the path of travel. One such means is shown in FIGS. 3 and 4 where secondary base member 8 is attached to two threaded rods 20 by hinges 22. The rods pass through holes in beam 24 and are secured by handwheels 26. Turning handwheels 26 will vary the distances base member 8, reflector 6 and source 18 are located from the path of travel of the surface of the workpiece. Beam 24 may be rigidly affixed to the framework of the processor or it may be attached, as shown in FIGS. 3 and 4, to rotatable axle 28 journaled in bearings, not shown, at either end. Braces 30 provide additional support for the structure. Axle 28 permits rotation of the secondary reflector and secondary source of ultraviolet light about an axis which is generally perpendicular to the path of travel. Paths of rotation of the secondary reflectors are shown by the dashed arcs 32 in FIG. 2.

In another preferred embodiment, the ultraviolet light processor includes means for varying the angle between the major dimension of the secondary means for exposing the surface of a workpiece to ultraviolet light and the path of travel of the surface. Most often the major dimension of the secondary means is the length of an element of the concave substantially elliptical reflector. One means for varying the angle is shown in FIGS. 3 and 4. Handwheels 26 may be turned by differing amounts resulting in the elevation or depression of one end of the reflector with respect to the other end. The clearances between the sides of the holes in beam 24 and rods 20 are great enough to permit rods 20 to depart from the vertical when the elements of the substantially elliptical reflector are not horizontal. Hinges 22 permit angular variation between secondary base member 8 and threaded rods 20. Usually the secondary reflector may be tilted up to about 15° from the path of travel of the surface of the workpiece, although greater angles may be used, if desired.

The lengths of reflectors 6 and sources 18 are most often substantially less than half the length of reflectors 1 and sources 10. This permits more ultraviolet radiation to be delivered from sources 18 by reflectors 6 to the lateral edges of the surface 12 of workpiece 14 than to the central regions of the surface. Typically, the secondary sources 18 are 55 centimeters or less in length. Most often they have lengths of 35 centimeters or less.

In order to interrupt exposure of the surface of a workpiece to ultraviolet light or to provide access to the workpiece without extinguishing the sources of ultraviolet light, reflectors 1 and reflectors 6 may be provided with movable shutters. There are many configurations of such shutters which may be exemplified by sliding flat shutters and rotating concave shutters. Preferably, but not necessarily, conduits may be affixed to the shutters for the circulation of coolant therethrough.

Any suitable source which emits ultraviolet light, viz, electromagnetic radiation having a wavelength in the range of from about 180 to about 400 nanometers, may be used in the practice of this invention. Suitable sources are mercury arcs, carbon arcs, low pressure mercury lamps, medium pressure mercury lamps, high pressure mercury lamps, swirl-flow plasma arc and ultraviolet light emitting diodes. Particularly preferred are ultraviolet light emitting lamps of the medium or high pressure mercury vapor type. Such lamps usually have fused quartz envelopes to withstand the heat and transmit the ultraviolet radiation and are ordinarily in the form of long tubes having an electrode at both ends. Examples of these lamps are PPG Models 60-2032, 60-0393, 60-0197 and 60-2031 and Hanovia Models 6512A431, 6542A431, 6565A431 and 6577A431.

The voltages and currents used to operate the ultraviolet light sources are known in the art. When, for example, the ultraviolet light emitting lamps are medium pressure mercury lamps, each having a length of about 63.5 centimeters, an alternating current voltage of about 800 volts may be impressed across each lamp. Each lamp then draws about 6.4 amperes.

Substantially any ultraviolet light curable coating composition can be cured using the present invention. These ultraviolet light curable coating compositions contain at least one polymer, oligomer or monomer which is ultraviolet light curable. Examples of such ultraviolet light curable materials are unsaturated polyesters, acrylic (including the α-substituted acrylic) functional monomers, oligomers and polymers, the epoxy resins in admixture with masked Lewis acids, and the aminoplasts used in combination with a compound with ultraviolet light converts to an acid. Examples of such a compound to be used with aminoplast resins are the chloromethylated or bromomethylated aromatic ketones as exemplified by chloromethylbenzophenone.

The most commonly used ultraviolet light curable compounds contain a plurality of sites of ethylenic unsaturation which, under the influence of ultraviolet light become crosslinking sites through addition reactions. The sites of ethylenic unsaturation may lie along the backbond of the molecule or they may be present in side chains attached to the molecular backbone. As a further alternative, both of these arrangements may be present concurrently.

The organic ultraviolet light curable ethylenically unsaturated polyesters and the organic ultraviolet light curable acrylic oligomers, especially the oligomeric diacrylates and oligomeric dimethacrylates, constitute preferred classes of ultraviolet light curable compounds for use in the practice of this invention. An example of such an oligomeric diacrylate is 3-acrylyloxy-2,2-dimethylpropyl 3-acrylyloxy-2,2-dimethylpropionate.

Vinyl monomers which crosslink with the compound containing a plurality of sites of ethylenic unsaturation to form thermoset materials may be present in the coating composition. These monomers are preferably miscible with the compound and are preferably free of non-aromatic carbon—carbon conjugates double bonds. Examples of such vinyl monomers are styrene, divinyl benzene, methyl acrylate, methyl methacrylate, ethyl acrylate and butyl acrylate. The use of one or more vinyl monomers is desirable because the greater mobility of the smaller vinyl monomer molecule as compared to the much larger first component, allows crosslinking to proceed faster than if the vinyl monomer were absent. Another benefit is that the vinyl monomer usually acts as a reactive solvent for the first component thereby providing coating compositions having a satisfactorily low viscosity without using an inordinate amount, if any at all, of volatile, non-reactive solvent.

The vinyl monomer, or mixtures of vinyl monomers, may be employed over a broad range. At the lower end of the range, no vinyl monomer need be used. The upper end of the range is a moderate excess of vinyl monomer over the stoichiometric amount required to crosslink the ethylenic unsaturation of the first component. The amount of monomer should be sufficient to provide a liquid, flowable, interpolymerizable mixture. Ordinarily, the monomer will be present in the coating composition in the range of from about 0 to about 45 percent by weight of the binder of the coating composition. When used, the vinyl monomer will ordinarily be in the range of from about 15 to about 30 percent by weight of the binder.

Extender pigments which are generally transparent to both ultraviolet light and visible light are optional ingredients which are often included in the coating composition. Examples of suitable extender pigments are finely divided particles of silica, barytes, calcium carbonate, talc, magnesium silicate, aluminum silicate, etc. The extender pigments do not ordinarily provide significant additional hiding, but they accelerate the rate at which opacity is obtained. Extender pigment is generally present in an amount in the range of from about 0 to about 40 percent by weight of the coating composition. An amount in the range of from about 0 to about 15 percent is more often employed. When extender pigment is used, it is usually present in the range of from about 1 to about 15 percent by weight of the coating composition. Although a single extender pigment is ordinarily used, mixtures of several extender pigments are satisfactory.

Opacifying or coloring pigments may also be included in the ultraviolet light curable coating compositions. The amount of these pigments should not be so great as to seriously interfere with the curing of the binder. Dyes and tints may similarly be included.

Another optional ingredient which is often included in the coating composition is an inert volatile organic solvent.

Photoinitiators, photosensitizers or both photoinitiators and photosensitizers are often included in ultraviolet light curable coating compositions. These materials are well known to the art. The preferred photosensitizer is benzophenone and the preferred photoinitiators are isobutyl benzoin ether, mixtures of butyl isomers of butyl benzoin ether and $\alpha,\alpha$-diethyoxyacetophenone.

The photoinitiator, photosensitizer or mixture of these is usually present in the ultraviolet light curable coating composition in an amount in the range of from about 0.01 percent to about 50 percent by weight of the binder of the coating composition. An amount in the range of from about 0.05 percent to about 10 percent is more often used. An amount in the range of from about 0.1 percent to about 5 percent is preferred.

Although several of the optional materials commonly found in ultraviolet light curable coating compositions have been described, the list is by no means inclusive. Other materials may be included for purposes known to the art.

Although the curing of the uncrosslinked coating composition (A-stage) may be carried out only until a gel (B-stage) is formed, it is generally preferred that curing should continue until the fully cured stage (C-stage) is obtained where the coating has been crosslinked into a hard, infusible film. These fully cured films exhibit the high abrasion resistance and high mar resistance customarily associated with C-stage polymer films.

The ultraviolet light curable coating compositions are used to form cured adherent coatings on substrates. The substrate is coated with the coating composition using substantially any technique known to the art. These include spraying, curtain coating, dipping, roller application, painting, brushing, printing, drawing and extrusion. The coated substrate is then passed under the reflectors of the ultraviolet light processor so that the coating is exposed to ultraviolet light of sufficient intensity for a time sufficient to crosslink the coating during the passage.

The times of exposure to ultraviolet light and the intensity of the ultraviolet light to which the coating composition is exposed may vary greatly. Generally the exposure to ultraviolet light should continue to the C-stage when hard, mar and abrasion resistant films result. In certain applications, however, it may be desirable for the curing to continue only to the B-stage.

Substrates which may be coated with the compositions of this invention to form workpieces may vary widely in their properties and may be of definite length or of long or indefinite length, such as a web. Organic substrates such as wood, fiberboard, particle board, composition board, paper, cardboard and various polymers such as polyesters, polyamides, cured phenolic resins, cured aminoplasts, acrylics, polyurethanes and rubber may be used. Inorganic substrates are exemplified by glass, quartz and ceramic materials. Many metallic substrates may be coated. Exemplary metallic substrates are iron, steel, stainless steel, copper, brass, bronze, aluminum, magnesium, titanium, nickel, chromium, zinc and alloys. Usually, but not necessarily, the surface of the workpiece is flat.

Cured coatings of the ultraviolet light curable coating composition usually have thicknesses in the range of from about 0.001 millimeter to about 3 millimeters. More often they have thicknesses in the range of from about 0.007 millimeter to about 0.3 millimeter. When the ultraviolet light curable coating composition is in an ultraviolet light curable printing ink, the cured coatings usually have thicknesses in the range of from about 0.001 millimeter to about 0.03 millimeter.

I claim:

1. In the method wherein the surface of a workpiece is exposed to ultraviolet light from at least one primary optical system comprising a first source of ultraviolet light and a reflector for reflecting ultraviolet light from said first source to said surface such that the ultraviolet flux from said primary optical system incident per unit area of said surface is greater at the central region of said surface than at an edge thereof, the improvement comprising: exposing said surface to ultraviolet light from at least one secondary optical system comprising a second source of ultraviolet light and a reflector for reflecting ultraviolet light from said second source to said surface such that the ultraviolet flux from said secondary optical system incident per unit area of said surface is greater at said edge than at said central region thereof, to thereby cause said central region and said edge to be exposed to approximately equal total amounts of ultraviolet energy per unit area.

2. The method of claim 1 wherein said surface is exposed to ultraviolet light from a plurality of said primary optical systems.

3. The method of claim 1 wherein said surface is continuously moved through the regions of ultraviolet light exposure.

4. The method of claim 1 wherein said surface is flat.

5. In the method wherein the surface of a workpiece is exposed to ultraviolet light from at least one primary optical system comprising a first source of ultraviolet light and a reflector for reflecting ultraviolet light from said first source to said surface such that the ultraviolet flux from said primary optical system incident per unit area of said surface is greater at the central region of said surface than at two edges thereof, the improvement comprising:
   a. exposing said surface to ultraviolet light from at least one secondary optical system comprising a second source of ultraviolet light and a reflector for reflecting ultraviolet light from said second source to said surface such that the ultraviolet flux from said secondary optical system incident per unit area of said surface is greater at one of said edges than at said central region; and
   b. exposing said surface to ultraviolet light from at least one other such secondary optical system such that the ultraviolet flux from said other secondary optical system incident per unit area of said surface is greater at the other of said edges than at said central region
to thereby cause said central region and said edges to be exposed to approximately equal total amounts of ultraviolet energy per unit area.

6. The method of claim 5 wherein said surface is exposed to ultraviolet light from a plurality of said primary optical systems.

7. The method of claim 5 wherein said surface is continuously moved through the regions of ultraviolet light exposure.

8. In an ultraviolet light processor having primary means for exposing the surface of a workpiece to ultraviolet light such that the ultraviolet flux from said primary means incident per unit area of said surface is greater at the central region of said surface than at an edge thereof, the improvement comprising secondary means for exposing said surface to ultraviolet light such that the ultraviolet flux from said secondary means incident per unit area of said surface is greater at said edge than at said central region.

9. The ultraviolet light processor of claim 8 including means for continuously moving said surface along a path of travel through the ultraviolet light exposure regions of said processor.

10. The ultraviolet light processor of claim 9 including means for varying the distance between said secondary means and said path of travel.

11. The ultraviolet light processor of claim 9 including means for varying the angle between the major dimension of said secondary means and said path of travel.

12. The ultraviolet light processor of claim 9 including means for rotating said secondary means about an axis which is generally perpendicular to said path of travel.

13. In an ultraviolet light processor having primary means for exposing the surface of a workpiece to ultraviolet light such that the ultraviolet flux from said primary means incident per unit area of said surface is greater at the central region of said surface than at two edges thereof, the improvement comprising:
   a. secondary means for exposing said surface to ultraviolet light such that the ultraviolet flux from said secondary means incident per unit area of said surface is greater at one of said edges than at said central region; and
   b. other secondary means for exposing said surface to ultraviolet light such that the ultraviolet flux from said other secondary means incident per unit area of said surface is greater at the other of said edges than at said central region.

14. The ultraviolet light processor of claim 13 including means for continuously moving said surface through the ultraviolet light exposure regions of said processor.

15. The ultraviolet light processor of claim 13 wherein said primary means comprises at least one primary optical system comprising a first source of ultraviolet light and a reflector for reflecting ultraviolet light from said source to said surface.

16. The ultraviolet light processor of claim 15 wherein said reflector is a concave cylindrical reflector.

17. The ultraviolet light processor of claim 15 wherein said reflector is a concave substantially elliptical cylindrical reflector.

18. The ultraviolet light processor of claim 17 wherein the eccentricity of said concave substantially elliptical cylindrical reflector is in the range of from about 0.2 to about 0.9.

19. The ultraviolet light processor of claim 18 wherein said first source of ultraviolet light is a generally linear source of ultraviolet light.

20. The ultraviolet light processor of claim 19 wherein said generally linear source of ultraviolet light is of the medium or high pressure mercury vapor type.

21. The ultraviolet light processor of claim 19 wherein said generally linear source of ultraviolet light is located at the first focus of said concave substantially elliptical reflector.

22. The ultraviolet light processor of claim 19 wherein said primary means comprises a plurality of said primary optical systems.

23. The ultraviolet light processor of claim 13 wherein each said secondary means comprises at least one secondary optical system comprising a second source of ultraviolet light and a reflector for reflecting ultraviolet light from said source to said surface.

24. The ultraviolet light processor of claim 23 wherein said reflector is a concave cylindrical reflector.

25. The ultraviolet light processor of claim 24 wherein said reflector is a concave substantially elliptical reflector.

26. The ultraviolet light processor of claim 25 wherein the eccentricity of said concave substantially elliptical cylindrical reflector is in the range of from about 0.2 to about 0.9.

27. The ultraviolet light processor of claim 26 wherein said second source of ultraviolet light is a generally linear source of ultraviolet light.

28. The ultraviolet light processor of claim 26 wherein said generally linear source of ultraviolet light is of the medium or high pressure mercury vapor type.

29. The ultraviolet light processor of claim 26 wherein said generally linear source of ultraviolet light is located at the first focus of said concave substantially elliptical reflector.

30. In an ultraviolet light processor having
 a. primary means comprising a plurality of primary optical systems for exposing the surface of a workpiece to ultraviolet light such that the ultraviolet flux from said primary means incident per unit area of said surface is greater at the central region of said surface than at two edges thereof, each of said primary optical systems comprising
  1. a first, generally linear source of ultraviolet light, and
  2. a concave substantially elliptical cylindrical reflector having an eccentricity in the range of from about 0.2 to about 0.9 for reflecting ultraviolet light from said source to said surface; and
 b. means for continuously moving said surface through the ultraviolet light exposure regions of said processor,
the improvement comprising
 c. secondary means comprising at least one secondary optical system for exposing said surface to ultraviolet light such that the ultraviolet flux from said secondary means incident per unit area of said surface is greater at one of said edges than at said central region; said secondary optical system comprising
  1. a second generally linear source of ultraviolet light, and
  2. a concave substantially elliptical cylindrical reflector having an eccentricity in the range of from about 0.2 to about 0.9 for reflecting ultraviolet light from said second source to said surface; and
 d. other secondary means comprising at least one other such secondary optical system for exposing said surface to ultraviolet light such that the ultraviolet flux from said other secondary means incident per unit area of said surface is greater at the other of said edges than at said central region.

* * * * *